June 20, 1961 A. H. DICKINSON 2,989,235

BINARY-DECIMAL CONVERSION SYSTEM

Filed Dec. 31, 1954 14 Sheets-Sheet 1

INVENTOR
ARTHUR H. DICKINSON

BY [signature]

ATTORNEY

June 20, 1961 A. H. DICKINSON 2,989,235

BINARY-DECIMAL CONVERSION SYSTEM

Filed Dec. 31, 1954 14 Sheets-Sheet 2

BINARY-DECIMAL CONVERSION SYSTEM

Filed Dec. 31, 1954 14 Sheets-Sheet 4

BINARY-DECIMAL CONVERSION SYSTEM

Filed Dec. 31, 1954 14 Sheets-Sheet 5

BINARY-DECIMAL CONVERSION SYSTEM

Filed Dec. 31, 1954

June 20, 1961 A. H. DICKINSON 2,989,235

BINARY-DECIMAL CONVERSION SYSTEM

Filed Dec. 31, 1954 14 Sheets-Sheet 8

June 20, 1961 A. H. DICKINSON 2,989,235

BINARY-DECIMAL CONVERSION SYSTEM

Filed Dec. 31, 1954 14 Sheets-Sheet 10

June 20, 1961 A. H. DICKINSON 2,989,235

BINARY-DECIMAL CONVERSION SYSTEM

Filed Dec. 31, 1954 14 Sheets-Sheet 11

United States Patent Office 2,989,235

Patented June 20, 1961

2,989,235
BINARY-DECIMAL CONVERSION SYSTEM

Arthur H. Dickinson, Greenwich, Conn., assignor to International Business Machines Corporation, New York, N.Y., a corporation of New York

Filed Dec. 31, 1954, Ser. No. 479,201
6 Claims. (Cl. 235—155)

Figure 1A:
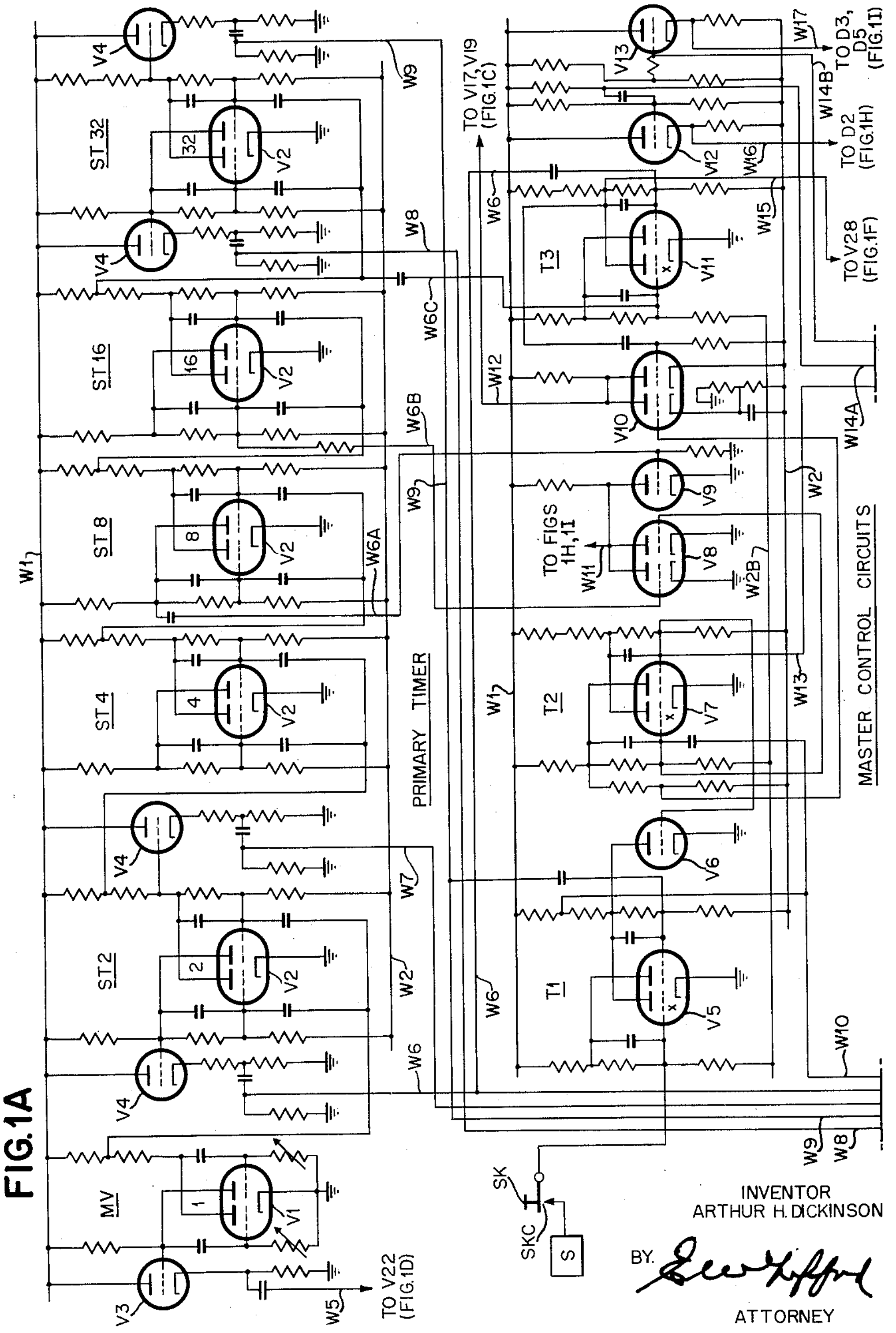

This invention relates to data processing machines and more particularly to means for effecting conversion of data in one data designating system of notation to another system, and vice versa, utilizing substantially the same basic equipment to effect a conversion from either system to the other.

An object is to provide a system of converting from either pure binary notation to decimal notation or from decimal notation to pure binary notation, using substantially the same basic equipment.

An object is to provide an electronic system for effecting conversions from a specific form of data representation to a different form of data representation.

An object is to provide an electronic pure binary-to-decimal and decimal-to-pure-binary conversion system which is selectively settable to effect either conversion.

An object is to provide a system from one system of notation to another which embodies the principle of dividing by "2."

It is known how to convert a number represented in the decimal system to a modified binary decimal system, in which decimal denominational orders represent digits by combinations of 1, 2, 4, 8 binary units with a means of effecting a carry to the next higher decimal order and resetting of the bit representing triggers to off status. It is also known how to reverse the process to convert the binary modified decimal representations to conventional decimal representation. The present invention differs from such systems in that the conventional decimal representation is converted to a pure binary form in a register or storage device comprising a series of stages representing all the powers of 2 to the $n$th power in which $n$ is the number of bits capacity of the register. The invention is bilateral or reversible to effect conversion from the pure binary $2^n$ form to the conventional decimal form using the same system of wiring and substantially the same basic components in both cases.

Other objects of the invention will be pointed out in the following description and claims and illustrated in the accompanying drawings, which disclosed, by way of example, the principle of the invention and the best mode, which has been contemplated, of applying that principle.

In the drawings:

FIGS. 1A to 1K constitute a wiring diagram.

Figure 1B:
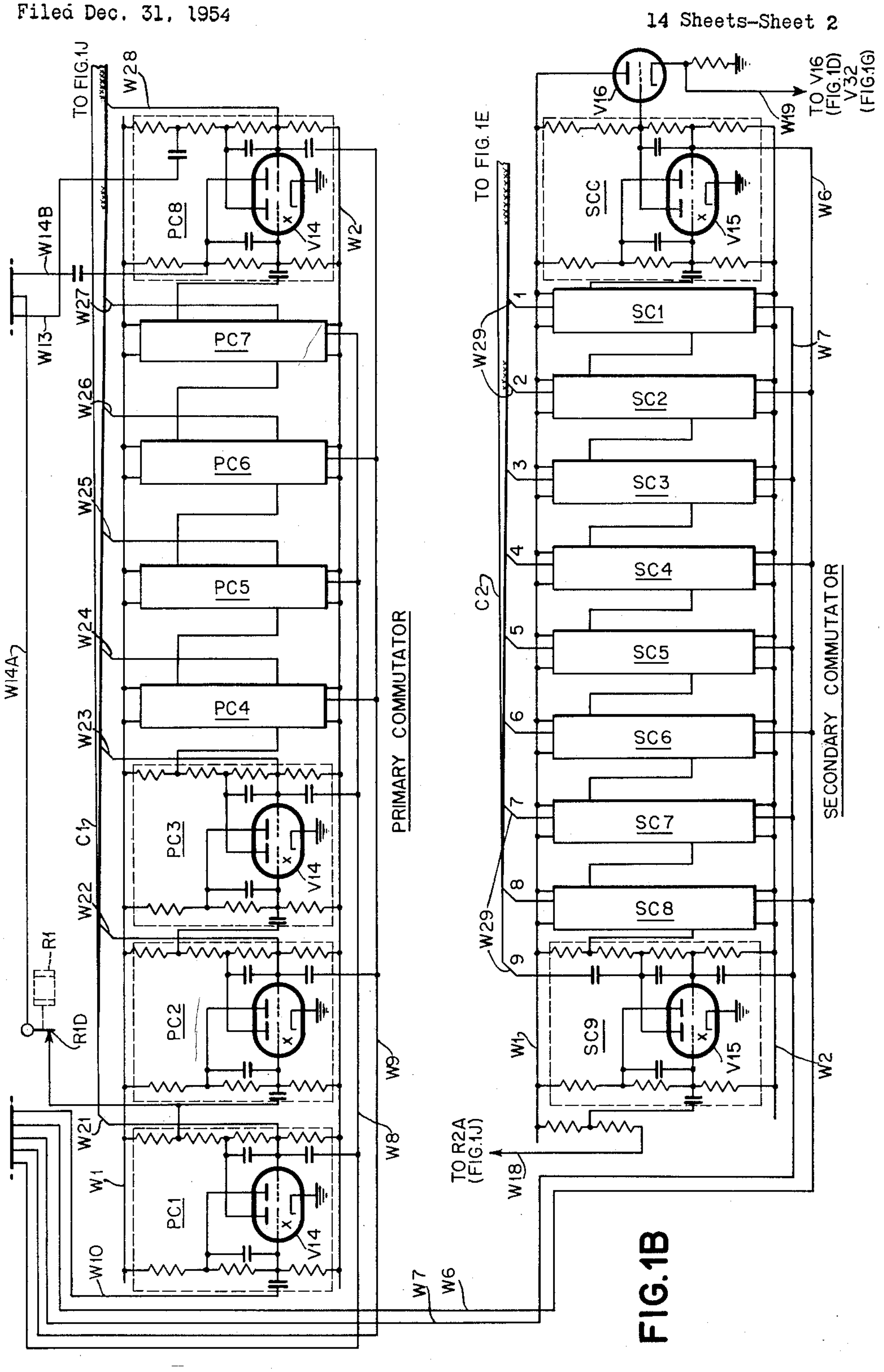
Figure 1C:
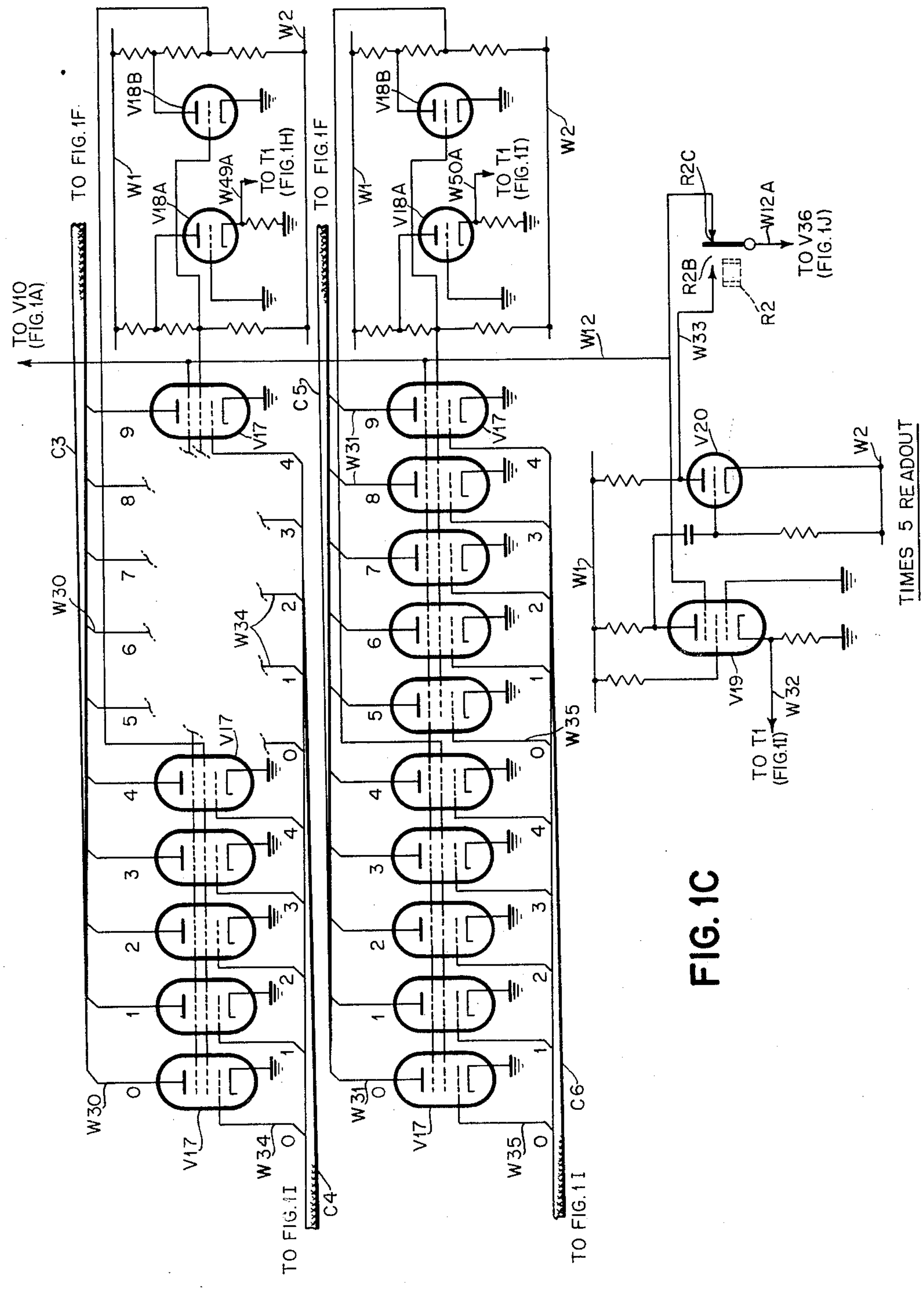
Figure 1D:
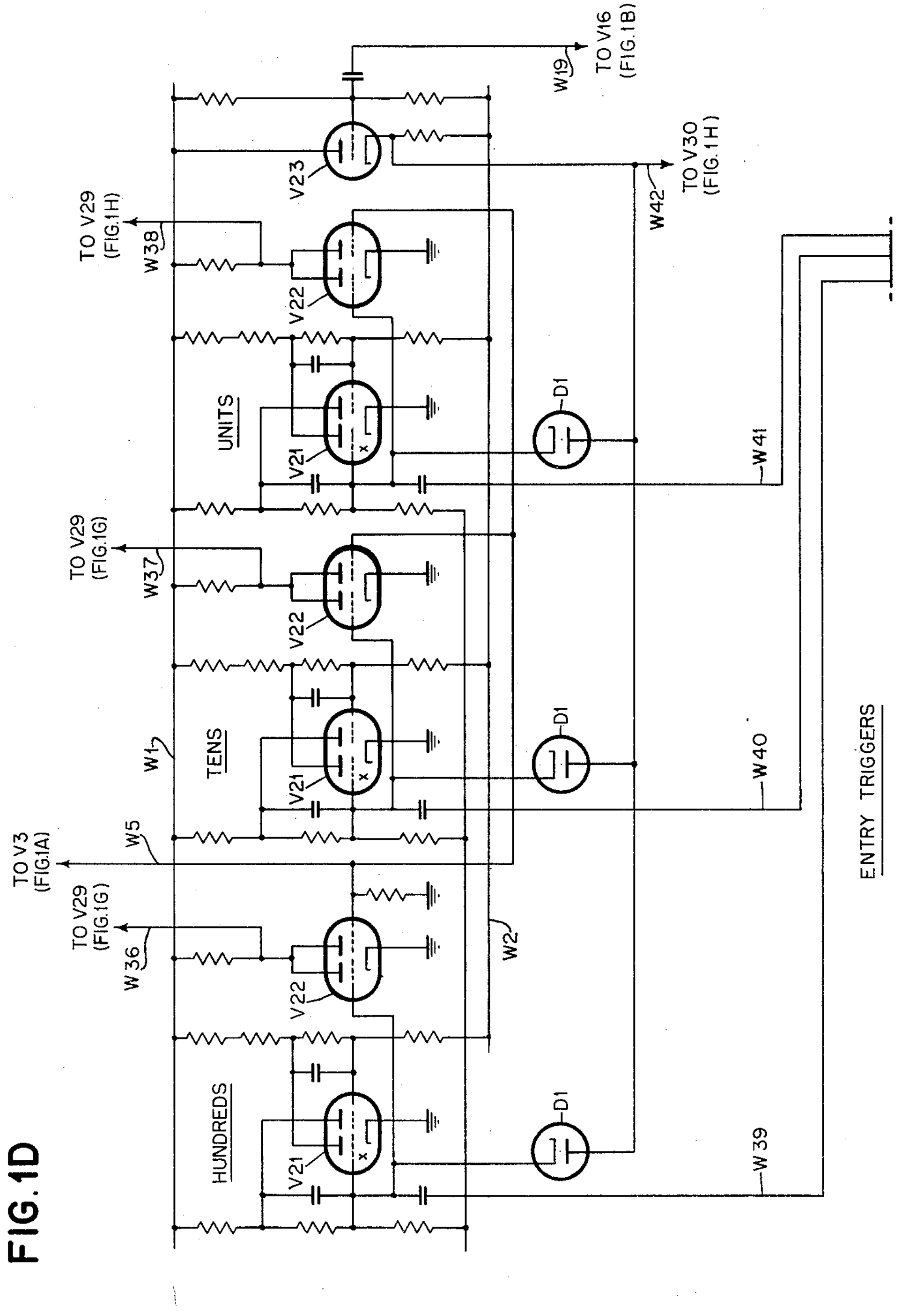
Figure 1E:
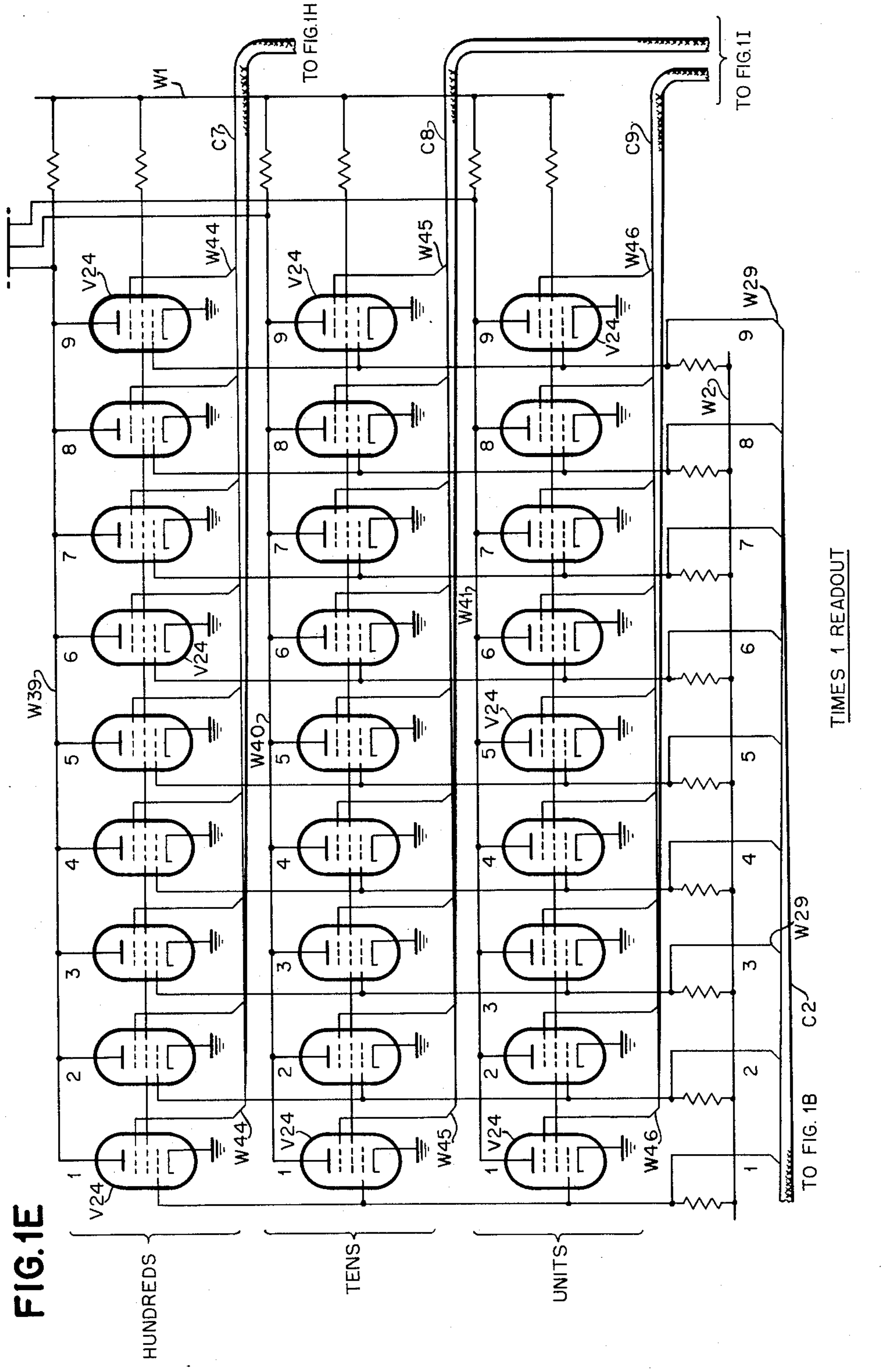
Figure 1F:
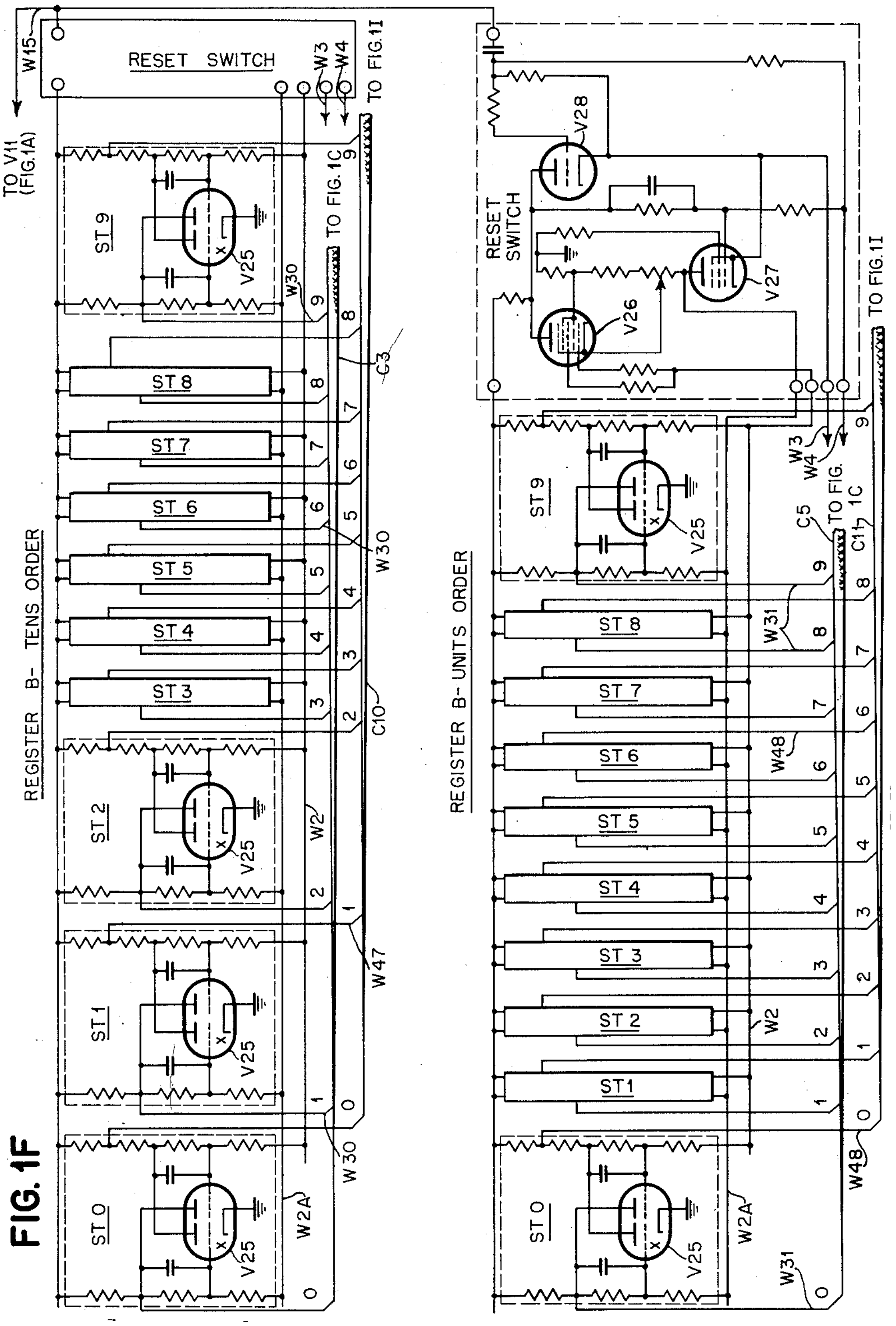
Figure 1G:
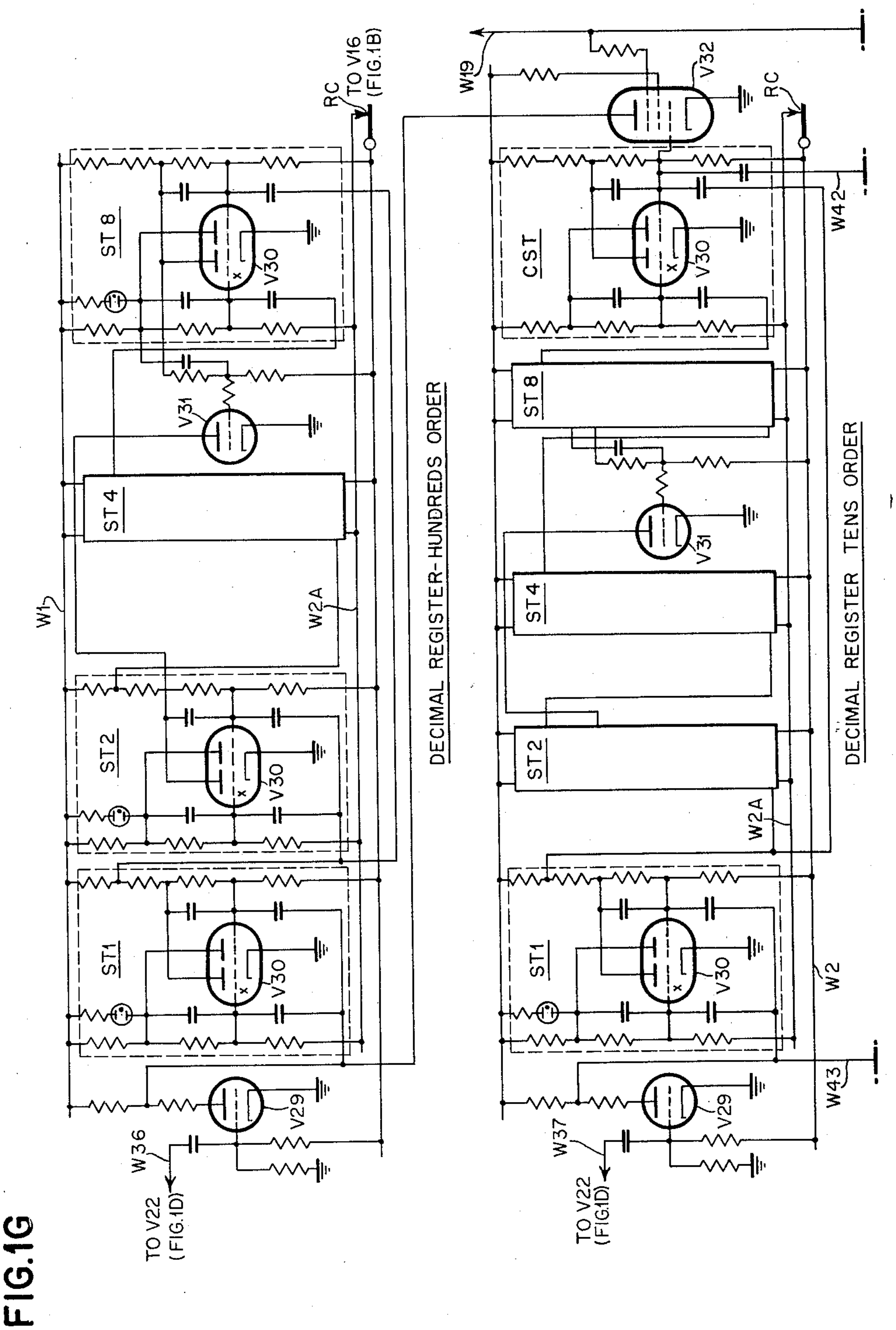
Figure 1H:
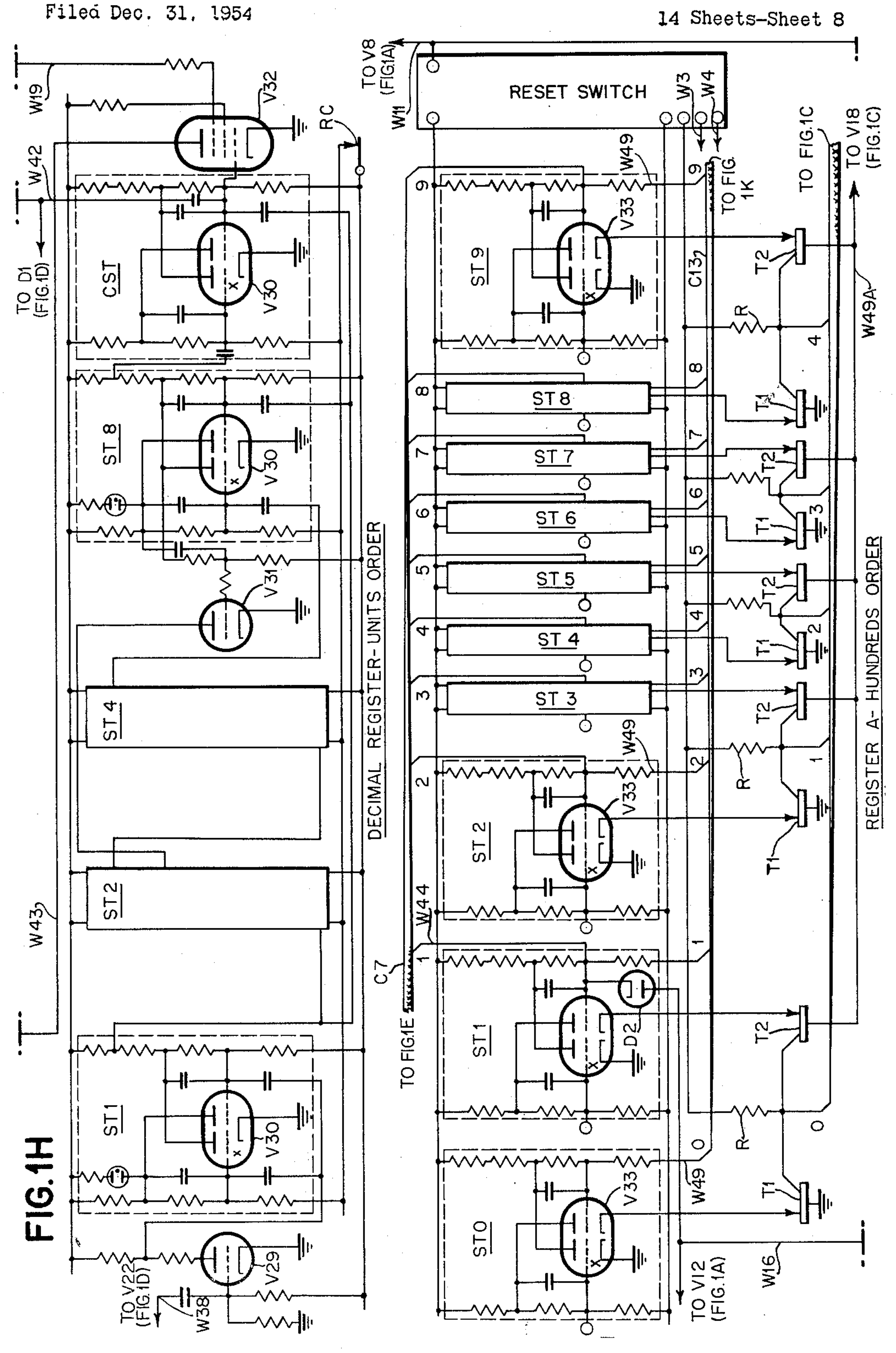
Figure 1I:
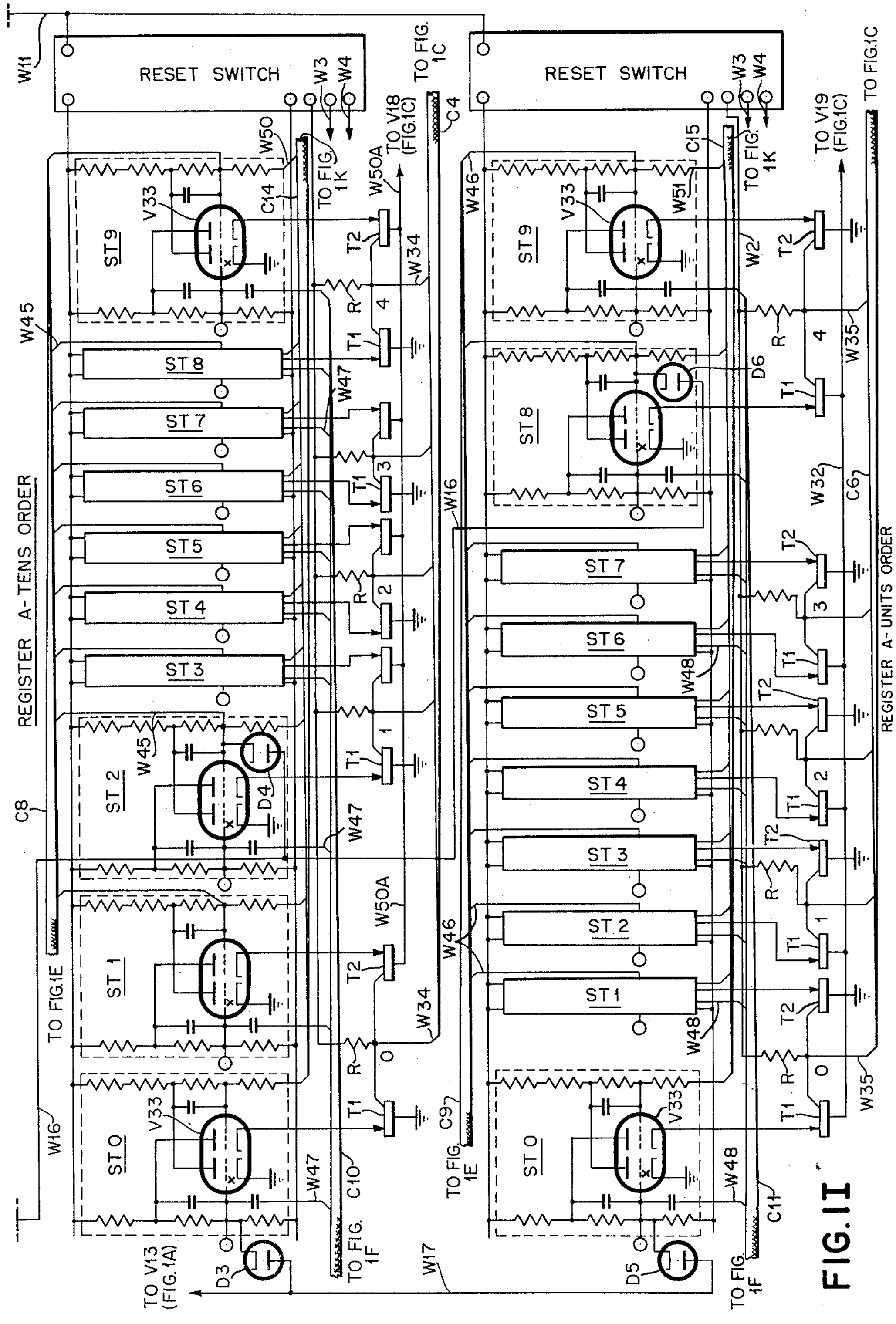
Figure 1J:
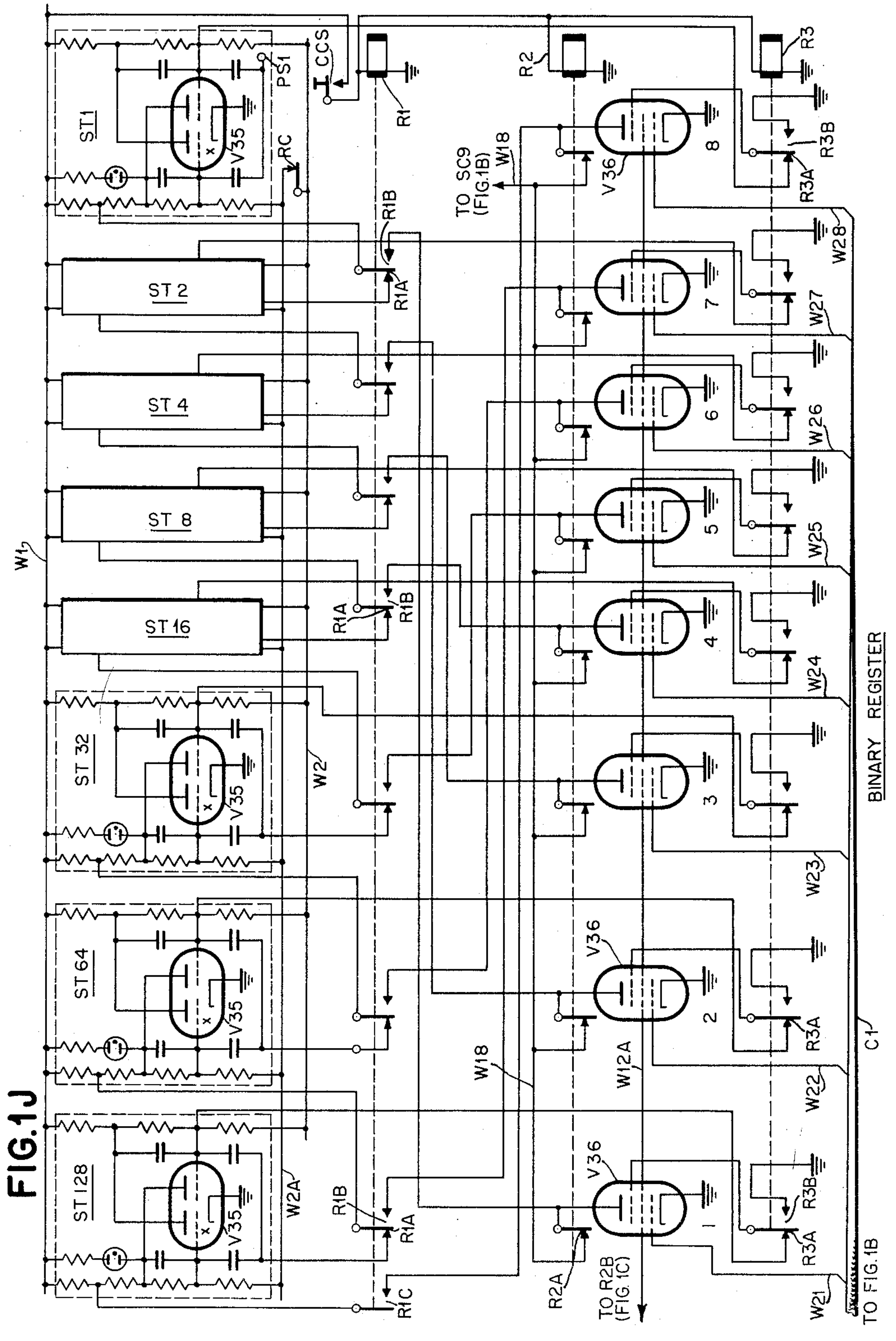
Figure 1K:
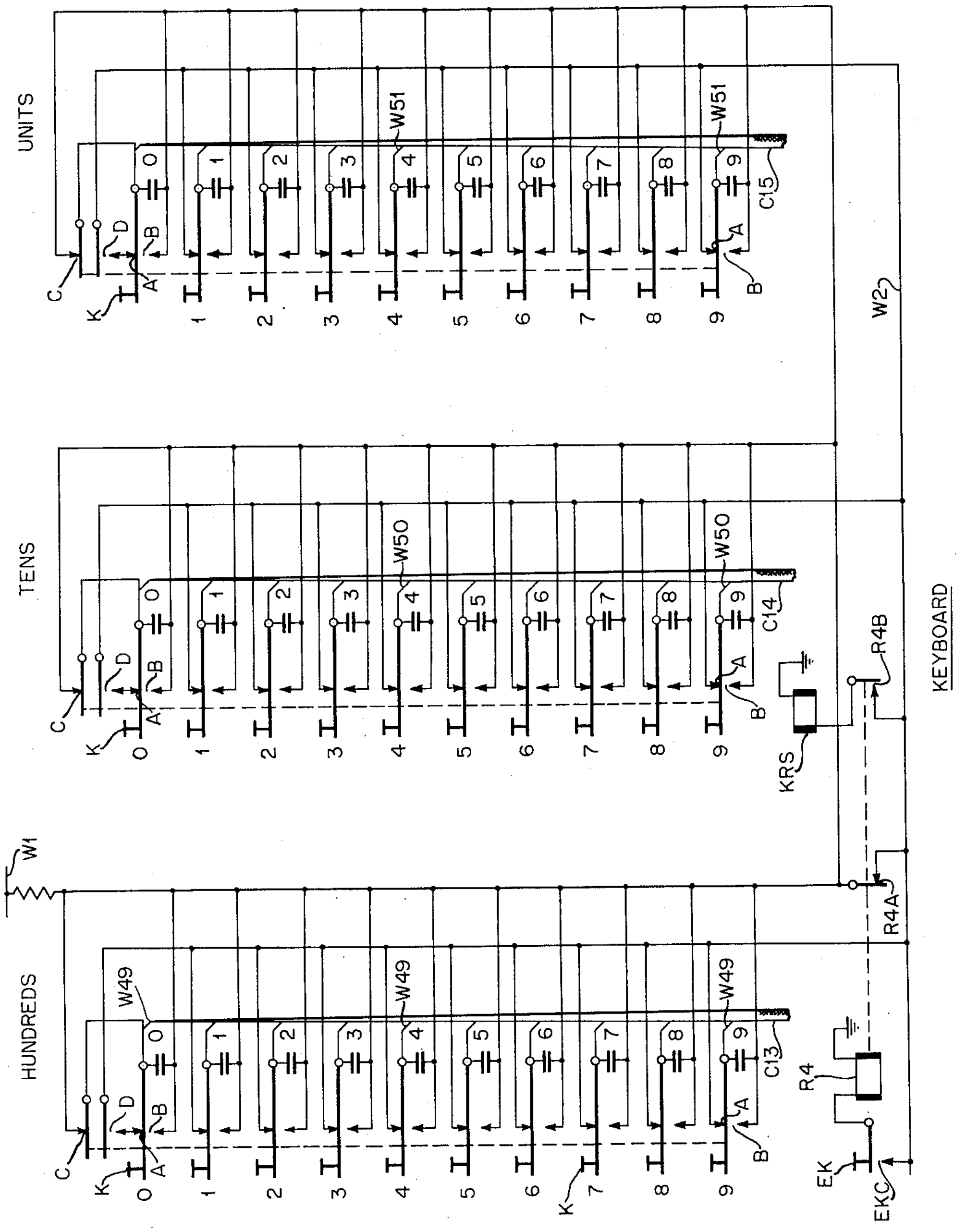
Figure 2:
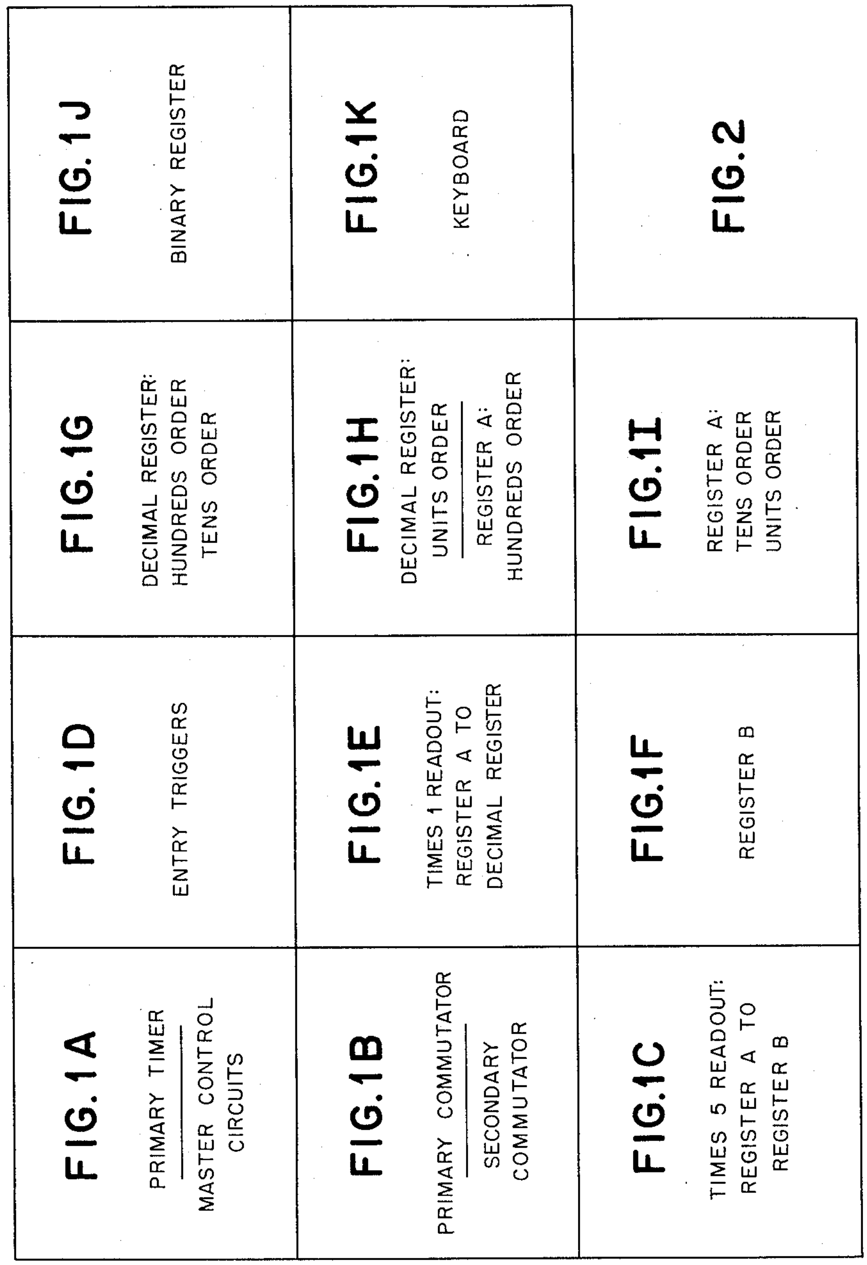

FIG. 2 is a diagram showing how FIGS. 1A to 1K may be arranged to form a complete wiring diagram and also indicates the location in the various figures of different units of apparatus involved in the converting system.

Figure 3A:
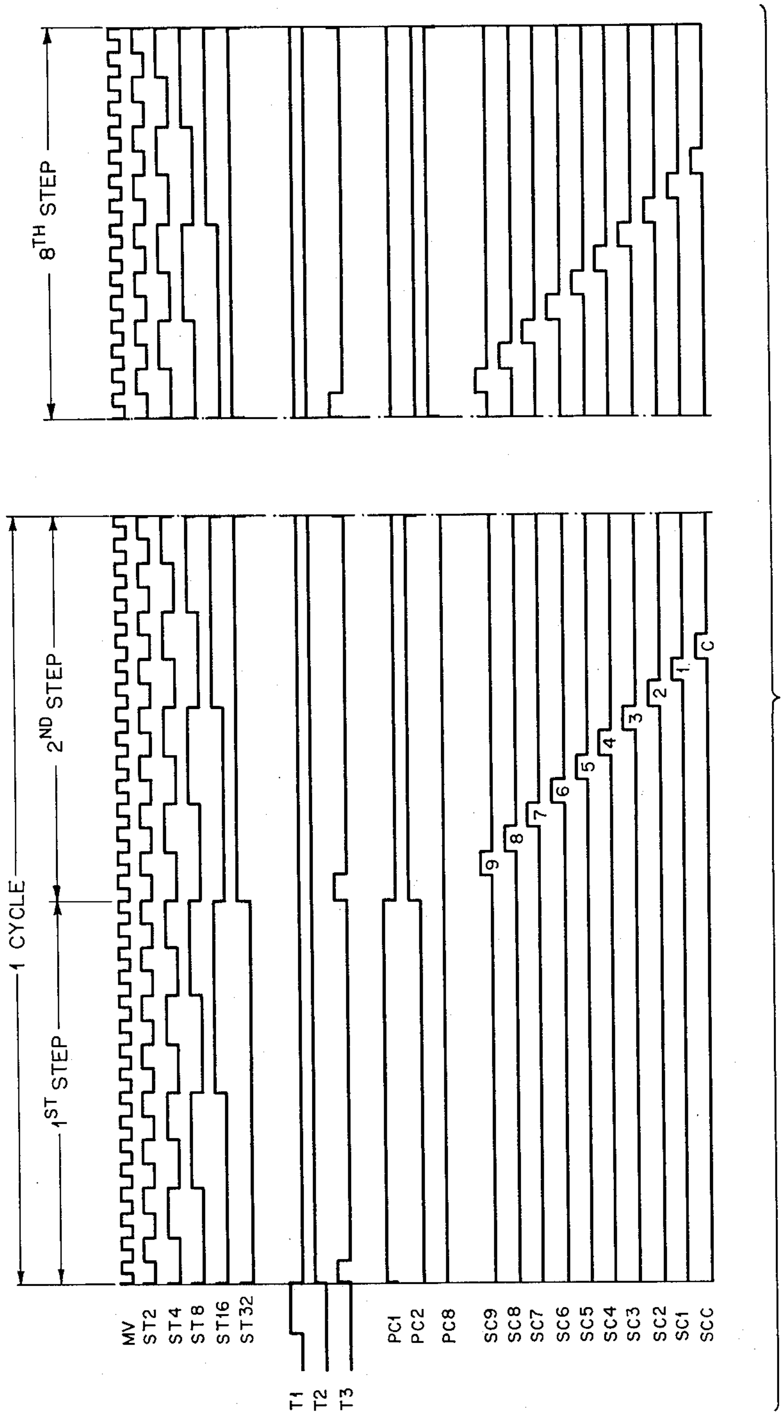
Figure 3B:
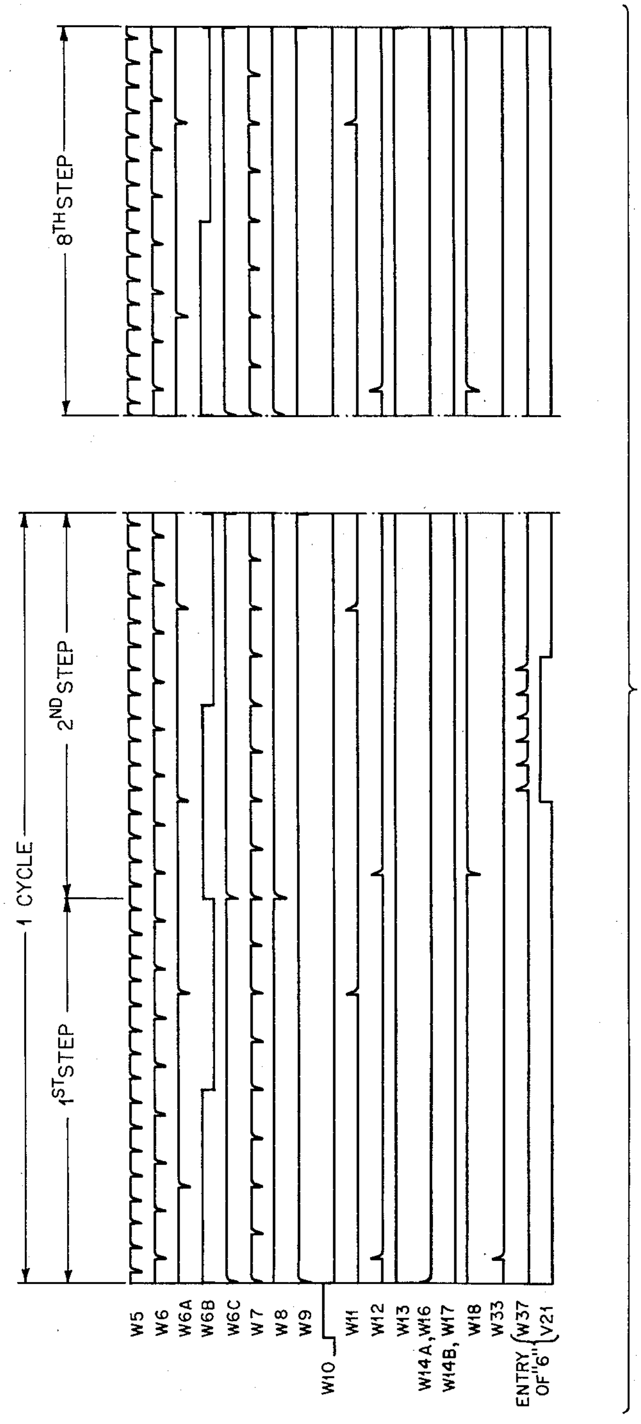

FIGS. 3A and 3B comprise a timing chart showing the sequence of the potential changes on various wires and operation of other circuit elements.

The machine is controlled by a primary timer disclosed in the upper half of FIG. 1A which includes the group of tubes designated V1 to V4. This timer consists of a six-stage binary counter of which the first stage comprises a conventional multivibrator designated MV in FIG. 1A and comprising the tube V1. The output of the tube V1 is applied to the grids of the tube V2 for the second stage ST2 which, as well as the remaining stages of the primary timer, is wired as a conventional bistable Eccles-Jordan "flip-flop" trigger. The binary values of the counter are indicated in FIG. 1A by the numerals 1, 2, 4, 8, 16, and 32 above the tubes V2. The primary timer, as driven by the multivibrator MV, completes a sequence of thirty-two pulses and repeats to constitute two steps of operation and one complete cycle of the timer.

Associated with the primary timer are the cathode follower tubes designated V3 and V4, the outputs of which control various units in the equipment.

Associated with the primary timer is a group of master control circuits which includes the tubes desginated V5 to V13. The tubes V5, V7, V11 are control triggers designated T1, T2, T3 which are rendered operative by the primary timer. The start trigger T1 is controlled by the start key SK and last stage ST32 of the primary timer through the right-hand inverter V4 and is normally Off, conductive on the left-hand side as indicated by the small letter "$x$" in FIG. 1A. The trigger T2 is controlled by the trigger T1 and the last stage PC8 of the primary commutator.

It will be understood that the primary timer is free-running and continually counting the multivibrator pulses which ordinarily, however, have no effect unless start key SK (FIG. 1A) is depressed to connect the left-hand grid of the start trigger T1 to a suitable source of negative pulses, generally designated S, through the contacts SKC. As soon as this takes place the master control circuits will be set in operation and the timed operation thereof will be controlled by the primary timer, the circuits being so arranged that the master control circuits will not start into operation until the primary timer starts a new series of thirty-two counts.

The machine is also equipped with a primary commutator (FIG. 1B) comprising eight conventional trigger stages designated PC1 to PC8, each of which is similar to the stages of the primary timer. The primary commutator is an open ring circuit in which operations are initiated with the stage PC1. Initially, when current is turned on, the primary commutator may start haphazardly at any stage but will run to zero status and stop with all triggers Off as indicated by the small letter "$x$" in FIG. 1B. The right-hand grids of the stages PC1 to PC8 are connected to the wires W21 to W28 of a cable C1 which (FIG. 1J) are connected to the control grids of the gate tubes V36. Thus, the gates V36 are sequentially made operative beginning at the left and ending at the right for a purpose which will be made clear hereinafter when the primary commutator is started in operation. The sequence of operation is indicated by the numerals 1 to 8 in FIG. 1J adjacent tubes V36.

There is also provided a secondary commutator (FIG. 1B) which includes ten trigger stages comprising tubes V15 and designated SC1 to SC9, SCC, and a cathode follower V16. As in the case of the primary commutator, the secondary commutator starts haphazardly with any stage when the current is turned On, runs to zero, and stops with the left-hand triodes of the triggers conducting, in Off status as indicated by the small letter "$x$" in FIG. 1B.

The outputs of the triggers SC1 to SC9 for the respective stages of the secondary commutator are connected by the wires W29, which are digitally related, as indicated by the small numerals 1 to 9, of the cable C2, to the grids of the Times 1 Readout (FIG. 1E). The Times 1 Readout comprises three sets of readout gates or switches composed of the pentode tubes V24. The control grids of the vertical rows of tubes V24 are connected in common on a digital basis to the wires W29. For example, the extreme left-hand vertical row of tubes V24 are connected in common to the "1" wire W29 of cable C2 which, it will be seen in FIG. 1B, is connected to the output side of the trigger tube V15 for stage SC1 of the secondary commutator. Thus, when the secondary commutator has counted down to "1," the stage SC1 will be triggered On and a positive pulse will be emitted over wire W29 to the group of control grids connected to the "1" wire W29 of cable C2. After this, the carry trigger SCC will be triggered On and will cause the tube V16 to conduct and cause a positive pulse to be emitted over wire W19.

In FIG. 1D there is shown a system of read-in or entry triggers and gates for the decimal register which consists of the pairs of tubes V21, V22 and the reset control tube V23 for the entry triggers. The entry triggers are arranged in three sections, each section comprising a trigger V21 and a double triode gate V22, the output of which is applied to one of the wires W36, W37, W38. Initially, the triggers V21 are reset to conduct on the left-hand triode, as indicated by the small letter "*x*" in FIG. 1D. The triggers V21 are indirectly controlled by Register A through negative input pulses produced on the wires W39, W40, W41 by the Times 1 Readout in FIG. 1E and render the gates V22 effective to produce positive pulses on the wires W36, W37, W38 which effect entries of values in the decimal register.

The machine is provided with a number of registers for controlling the conversion from binary to decimal, or from decimal to binary Register A is shown in FIGS. 1H and 1I and, for the purpose of illustrating the invention, has been disclosed as having three decimal orders, the units and tens orders being shown in FIG. 1I and the hundreds order in the lower half of FIG. 1H. The three orders are substantially identical and each consists of a series of ten "flip-flop" trigger stages designated ST0 to ST9 which are identically wired in respect to the resistor networks and differ only in certain special connections to different trigger stages through diodes designated D2 to D6 and transistors T1, T2. Normally, all of the stages are conductive in Off status on the left-hand side, as indicated by the small letter "*x*."

It will be noted in FIGS. 1H and 1I that the right-hand grid of each of the stages ST0 to ST9 is connected through a resistor to a wire W49, W50, or W51 in the cables C13, C14 and C15, respectively. These cables are shown in FIG. 1K as having the wires W49, W50 and W51 connected on a digital basis to the hundreds, tens and units orders of the keyboard. The wires W49, W50, W51 and the contacts A of the keys K normally connect the right-hand grids of the trigger tubes V33 of Register A to the common bias line W2.

Whenever a key K (FIG. 1K) is depressed, closing the contact B, a circuit is completed from the line wire W1 through the proper wire W49, W50, or W51 in the associated cable C13, C14 or C15, to the right-hand grid (FIG. 1H or 1I) of the trigger which is to be turned On to represent the digit to be entered in Register A. This connection is made in parallel with the closed contacts R4A of entry controlling relay R4. Each time a digit key is operated, the zero bar closes contacts D and opens contacts C and has the effect of preventing the zero stage ST0 for the affected order from being turned On by connecting its grid to the bias wire W2.

Next, the entry key EK is depressed, closing contacts EKC to energize entry relay R4 and opening contacts R4A. This has the effect of disconnecting the closed contacts B of the operated keys K from the bias line W2 and causes the triggers in the stages ST0 to ST9, representing the respective digits in Register A, to go On. The contacts C and D ensure that the zero stages ST0 will be turned On when either no digit key is operated in any row or only the zero key is operated. Contacts R4B close and energize the key release solenoid KRS and allow the set keys to restore, re-opening the affected contacts B.

The keyboard disclosed in FIG. 1K is for the purpose of entering in Register A values which it is desired to convert to binary representation. It is contemplated that a mechanical keyboard, well known in the art, be provided in which the individual rows of keys are provided with a latching means which holds the operated key in depressed condition, which latching means may be released by the key release solenoid KRS (FIG. 1K). It is also contemplated that each row of keys be provided with a zero bar which operates the contacts C and D of which there is a set for each row of the keyboard to open contacts C and close contacts D.

It may be that in one of the orders no significant digit is to be entered in which case the zero stage ST0 for that order must be automatically triggered On. When the key EK is depressed and contacts R4A are opened as described above, if no key has been depressed, contacts C will be closed and the zero stage ST0 will be triggered On by a flow of current from the line wire W1, through the contacts C, the zero wire W49, W50 or W51 to the right-hand grid of the affected stage ST0.

There is also provided a storage register which is, in general, similar to Register A and is captioned Register B in FIG. 1F. This register comprises only two denominational orders each having ten isolated trigger stages designated ST0 to ST9. The individual register stages are conventional Eccles-Jordan triggers including the double triodes V25. In FIG. 1F it will be noted that each order of Register B is provided with an input cable C3 or C5 having the digital wires W30 or W31 which are connected to the right-hand anodes of the triodes V25 and an output cable C10 or C11 connected to the output voltage dividers through the wires W47 or W48, respectively. Normally the triggers V25 are reset simultaneously with the left-hand triodes conducting in Off status and, in entry operations, sharp voltage drops or negative pulses produced on the wires W30 or W31, in a manner hereinafter to be described, trigger the affected stages On. When the triggers are reset, the left-hand triodes will again conduct and, in the On stages, there will be a sharp drop in potential or negative pulse produced on left-hand anodes and the associated wires W47 or W48 which, of course, will be of digital significance according to the stages affected. The digital significance of the respective pulses into and from Register B is indicated by the small numbers 0 to 9 adjacent the different wires W30, W31, W47, W48.

Register B is reset by means of an individual reset switch for each order. This reset switch is of a well-known commercial form and will be merely very briefly described for the purpose of understanding its operation. The reset switch is outlined in broken lines in the lower right-hand half of FIG. 1F and includes the tubes V26, V27, V28. When a positive reset pulse is applied to wire W15 under control of the master control circuit group in FIG. 1A in a manner hereinafter to be described, the tube V28 is caused to conduct. This cuts off the tube V27 and causes a rise in potential on the reset wire W2A thereby causing the left-hand triodes of all of the stages ST0 to ST9 to conduct in Off status. As pointed out above, when this reset pulse occurs, there will be some one stage in each order in On status and the reversal of status will cause the negative output pulse to appear on the proper digital wire W47, W48. The manner in which these pulses control other apparatus will be explained more clearly hereinafter. The tube V26 in connection with the tubes V27, V28 acts as a voltage regulator in a well-known way to stabilize the voltages on the wire W2A to insure that transient conditions will not cause resetting at an inopportune time. A similar reset switch is provided for each order of register A but to save repetition on the drawings, is shown in block form in FIGS. 1H and 1I which are controlled by positive pulses on the wires W11 from the master control circuit group in FIG. 1A.

There is also provided a decimal result register disclosed in FIGS. 1G and 1H comprising three denominational orders and consisting of four binary register stages designated ST1, ST2, ST4, ST8, and, for the units and tens orders, a carry stage CST and a carry gate V32. Since, the decimal register must add in the decimal system, it is provided with a blocking tube V31 in each order which functions in a well-known way to cause the register to operate as a modified binary decimal register. This register receives entries consisting of trains of positive pulses on the wires W36, W37, W38 controlled by the entry triggers V21 and gates V22 in FIG. 1D. Since the pulses on wires W36, W37, W38 are positive, each stage of the decimal register is provided with an input inverter V29 which converts each positive pulse to a negative pulse applied to the grids of the first stage tube V30.

Each time the decimal register passes through zero in any order, the carry trigger CST is triggered On and carry gate V32 associated therewith is primed for conduction at the control grid. Subsequently a positive pulse on wire W19 is applied to the suppressor grids of all of the carry gates V32 causing them to conduct and produce a negative pulse which is applied directly to the first stage trigger ST1 of the next higher order of the decimal register to effect an entry of a unit therein in a well-known way. The carry pulses over wire W19 originate in the cathode follower tube V16 (FIG. 1B) controlled by the trigger SCC of the secondary commutator. The trigger SCC effects the carry operation at the end of a complete cycle of the secondary commutator which then stops with the triggers SC1 to SC9 and SCC reset in Off condition, conductive on the left-hand side.

A pure binary register (FIG. 1J) is also provided which is substantially similar in operation to the primary timer in that it is connected as a conventional binary counter, having the stages ST1, ST2, ST4, ST8, etc., to ST128, the suffix numerals indicating the binary bit values. In the present instance the lowest valued stage is at the right and the highest valued stage at the left so that the count goes from right to left instead of from left to right as in the case of the primary timer.

The number of stages in the binary register will depend upon the capacity of the system. In the present case, since only three decimal orders have been provided, the binary register is provided with only eight stages. The binary register, therefore, has a maximum capacity of 255 for purposes of illustration. However, the capacity of the binary register may be increased by means of one or more additional binary stages. For example, if a "256" stage were added, the register would have a capacity of 511. In other words, any number in the decimal notation up to the value 255 may be converted into a binary representation in the binary register. The binary register is used as a result register when converting from decimal to binary and the decimal register is used as a result register when converting from binary to decimal.

The binary register is associated with the gates V36 which were briefly discussed above and which are sequentially rendered effective from left to right (FIG. 1J) by the primary commutator. When converting from binary to decimal, the gates V36 control the secondary commutator to effect digital entries in the decimal register in accordance with the bit values stored in the different stages of the binary register. When converting from decimal to binary, the gates V36 are operated sequentially to trigger the different stages of the binary register On in accordance with the value in Register A.

The operation of conversion from binary to decimal will first be described.

The first operation is to insert the binary number in the binary register (FIG. 1J). There are various way in which this operation may be effected. For example, the plug socket PS1 in FIG. 1J may be connected to some other apparatus capable of emitting a series of pulses which in the aggregate represent the number to be converted to a decimal representation. Another way would be to directly selectively trigger the stages ST1 to ST128 On by parallel entries directly to the grids of the trigger tubes V35 under control of another register which may form part of a machine such as a commercial form of electronic data processing machine. Another possibility is that the binary register might be the result register of an electronic data processing machine. For present purposes it will be assumed that the number "77" has been entered by any suitable means in the binary register and that stages ST1, ST4, ST8, ST64 have been triggered On and will be conductive on the right-hand side of each trigger, the normal Off status being indicated in FIG. 1J by the small letter "*x*."

The conversion process is started in operation by depressing the start key SK, closing contacts SKC. This permits a negative starting pulse to be applied to the start trigger T1 (tube V5) (FIG. 1A) putting it On. For the moment nothing happens, as first it is necessary to synchronize the primary timer with the control circuits to make sure that the operation of the various conversion circuits and apparatus takes place in the proper sequence.

The primary timer is free-running and the closure of the start key contacts SKC is likely to occur at almost any point in the cycle of the timer.

At the end of a cycle or sequence which comprises thirty-two negative pulses from the multivibrator MV, the extreme right-hand trigger stage ST32 (FIG. 1A) of the primary timer will be triggered Off. This will sharply reduce conduction through the cathode follower V4 producing a negative pulse on wire W9 which is applied to the right-hand grid of the start trigger T1 turning it Off. The negative pulse produced on wire W10 when trigger T1 switches Off is applied to the left-hand grid of trigger T2 switching it On. Trigger T2 stays on until the conversion is completed. The negative pulse on wire W10 also is applied to the left-hand grid of the first stage PC1 (FIG. 1B) of the primary commutator turning this trigger On. The left-hand anode potential of the stage PC1 and wire W21 rises which, it will be seen in FIG. 1J, primes the first gate V36 at the left for conduction. When trigger T2 is switched On, the potential on the right-hand grid rises and causes the tube V6 to conduct, thereby maintaining the start trigger T1 in Off condition throughout the remainder of the conversion operation.

When the trigger PC1 is switched On, a positive pulse is produced on wire W14A through contacts R1D (FIG. 1B) which causes the cathode follower V12 (FIG. 1A) to conduct momentarily and produce a positive pulse on the wire W16. This positive pulse is applied through the diode D2 (FIG. 1H) to the right-hand grid of stage ST1 of register A, thus turning this stage On to represent the digit "1." The same pulse also is applied through the diode D4 (FIG. 1I) to stage ST2 of register A turning it On to represent the digit "2" and, through the diode D6, turns On stage ST8 for the units order of Register A. Thus, the value "128" is entered in Register A at the beginning of the first step or a half-cycle of the primary timer. However, it must be kept in mind that since "77" is stored in the binary register the stage ST128 in FIG. 1J is Off.

At the end of each half-cycle of operation of the primary timer, where the trigger V2 for stage ST16 (FIG. 1A) is switched Off and the trigger for stage ST32 is switched On, a negative pulse is applied over wire W6C to the left-hand grid of trigger T3 (tube V11) switching this trigger On. This produces a positive pulse on wire W15 which, it will be seen in FIG. 1F, renders the reset switches effective through the tubes V27, V28 to reset Register B in the manner described above, this action taking place invariably at the start of each operational step or half-cycle of operation of the primary timer.

At this point it should be noted that the arrangement of the timers is such that two separate conversion steps take place in each sequence or half-cycle of the primary timer and the foregoing description has assumed that the primary timer started with all of the stages Off as disclosed in FIG. 3A in which the vertical line at the extreme left represents the starting of a sequence in which all of the stages of the primary timer are Off.

After the initial two pulses of the multivibrator MV, stage ST2 of the primary timer is turned On, thus reducing the conduction of the cathode follower V4 and producing a negative pulse on wire W6 which turns Off trigger T3. When trigger T3 is turned Off, a negative pulse is applied to the right-hand grid of the dual triode gate V10, thus cutting it Off. Since the trigger T2 is turned On at this time, the left-hand grid of gate V10 is held at cutoff potential, thus causing a rise in potential of wire W12, priming all of the suppressor grids of the Times 5 Readout gates V17, and also the gate V19 (FIG. 1C).

The units order of Register A (Fig. 1I) now retains the value "8," stage ST8 being On, with the right-hand triode conducting, producing maximum current flow through the emitter of the transistor T1 associated with this stage. This produces a rise in potential on the wire W32 which, it will be noted in FIG. 1C, is connected to the cathode of the tube V19. In other words, the anode plate circuit of the right-hand triode of stage ST8 (FIG. 1A), the emitter circuit of transistor T1, and the cathode resistor of tube V19 form a continuous circuit which elevates the potential of the cathode of V19 sufficiently to cut off tube V19. Transistor T1 is also conducting a maximum in its collector circuit which includes a cathode resistor R terminated at the bias wire W2. This raises the potential on the "4" wire W35 and primes the two gates V17 in the lower row (FIG. 1C) which are associated with the digital values "9" and "4" identifying the wires W31. In the tens order the value "2" is stored and the transistor T1 associated with stage ST2 also is conducting a maximum and has the same effect with respect to the "1" wire W34. This maintains at high potential the control grids of the "1" and "6" tubes V17 in the upper row in FIG. 1C.

No current flow in any of the other transistors T1, T2 in the tens order of register A, consequently minimum current flows in wire W50A, holding the cathode of the lower tube V18A (FIG. 1C) at conducting potential. This cuts off lower tube V18B and primes the screen grids of the left-hand five gates V17 in the lower row of which the "4" gate has already been primed at the control grid. The lower tube V18A will conduct and cut off the remaining five gates V17.

The value "1" is stored in hundreds order (FIG. 1H), the transistor T2 for stage ST1 is conducting a maximum, and current will flow through wire W49A, cutting off the upper tube V18A. Tube V18B conducts cutting off the left-hand five gates V17 in the upper row and the remaining five are primed for conduction at the screen grids due to the high anode potential of the upper tube V18A.

The foregoing can be summed by stating that the "4" gate V17 (with respect to the wires W31) in the lower row is fully primed for conduction and the "6" gate V17 in the upper row with respect to wires W30 also is primed for conduction. Thus, when a pulse is produced on wire W12, as described above, the "6" and "4" gates V17 will be rendered fully conductive and current will flow in the "4" wire W31 and the "6" wire W30. In FIG. 1F it will be noted that the wires W30, W31 are connected to the right-hand anodes of the tubes V25. With respect to the units order of Register B, the "4" wire W31 is connected to the right-hand anode of stage ST4 and in the tens order of Register B the "6" wire W30 is connected to the corresponding anode of stage ST6. Thus the effect of conduction of the "4" and "6" gates V17 is to trigger On the units order stage ST4 and the tens order stage ST6 to enter the value "64" in Register B . This is half of "128" or five times that value and casting out the zero.

The trigger T2 is still in On status with its left-hand grid maintained at low potential. This cuts off the right-hand triode of the tube V8. When the trigger stage ST16 (FIG. 1A) goes On in each step of operation, the potential on its left-hand grid and wire W6B will fall, thereby cutting off the left-hand triode of tube V8. This puts the potential on wire W11 under control of the tube V9. When next the "8" trigger V2 is turned On, a negative pulse will be produced on wire W6A which will cut off tube V9 and produce a positive pulse on wire W11 which, it will be seen in FIGS. 1H and 1I, causes the reset switches for Register A to reset this register.

When the trigger T3 is switched Off at the beginning of the first step and produces the positive pulse on wire W12 which effected the transfer of "64" to Register B, the same pulse is applied to the screen grids of the gates V36 (FIG. 1J) through the contacts R2C (FIG. 1C) and wire W12A. However, since stage ST128 is Off, maintaining the suppressor grid of the extreme left-hand or "1" gate V36 at low potential through contacts R3A, the gate V36 does not conduct during the first step. Since the primary commutator has only advanced one step and only wire W21 is at high potential, none of the remaining gates V36 to the right in FIG. 1J will be affected. Consequently, the potential on the wire W18 will remain high and the secondary commutator (FIG. 1B) cannot be started during the first step or half-cycle of the primary timer.

During the second step of the primary timer, a negative pulse is produced on wire W8 as a consequence of stage ST32 trigger going On, which turns Off the first stage trigger PC1 of the primary commutator and, in doing so, turns On the second stage PC2. This raises the potential of wire W22 which, of course, in FIG. 1J will prime the second gate V36 from the left at the control grid. During this second step, a reset pulse again is emitted to the reset switches of register B, as described above, over the wire W15.

It will be noted in FIG. 1F, that the digital wires W47, W48 of cables C10, C11 are connected to the left-hand anodes of the stages of register B through the load resistors. Thus, when the register is reset, the "6" stage in the tens order and the "4" stage in the units order in going Off will produce a negative pulse on the "6" wire W47 of cable C10 and the "4" wire W48 of cable C11. These cables are connected to Register A (FIG. 1I) in such fashion that the correspondingly valued stages of the units and tens orders will be triggered On, it being noted that the wires W47, W48 are connected to the left-hand grids of the triggers so as to cut off the triggers whenever negative pulses appear on the wires W47, W48. Thus, during the second step of operation, the value "64" will be transferred to the Register A. During this second step of operation, when the trigger T3 is again turned Off, a pulse applied by wire W12 will cause the value "32" to be transferred from Register A to Register B by a sequence of operations similar to the transfer of "64" during the first step.

It will be noted in FIG. 1I that during the second step current will flow through the transistor T1 associated with stage ST6 in the tens order and will produce a rise in potential on the "3" wire W34 which will prime the two gates V17 connected to the "3" wire in the top row. In the case of the units order, current flow in the transistor T1 associated with stage ST4 will cause a rise in potential on the "2" wire W35 which will prime the two gates V17 (FIG. 1C) connected to the "2" wire in the bottom row. The affected transistor T1 in the tens order of Register A is not connected to wire W50 which will remain at low potential allowing the lower tube V18A (FIG. 1C) to conduct, thus cutting off the right-hand five gates V17 associated with tube V18A. The tube V18B in this case will be rendered non-conductive and the screen grids of the left-hand five tubes V17 will remain at high potential, but the one associated with the "2" wire W31 will also have its control grid (connected to the "2" wire W35) at high potential.

There is a zero in the hundreds order of Register A, stage ST0 (FIG. 1H) being On, and transistor T1 associated therewith is conducting a maximum. Since this transistor is not connected to the wire W49, the upper tube V18A (FIG. 1C) remains conductive and the upper tube V18B nonconductive. Thus the same condition prevails as for the lower row of gates V17 with the result that the "3" wire W30 and the "2" wire W31 will be effective in this case to transfer the value "32" to Register B.

It will be noted in FIG. 1H that the hundreds order of Register A is provided with transistors T1, T2 and a cable connection similar to the cables C4, C6. However, in this order the cathodes of the odd-numbered stages ST1, ST3, etc., could be directly connected to the wire W49 and the even-numbered stages grounded, dispensing with the necessity for the transistors T1, T2. These elements and the associated circuit wiring have been shown primarily to indicate the connections which must be necessary for the expansion of Register A to a greater number of orders. In such a case one or more additional rows of gates V17 would be provided immediately above the topmost row in FIG. 1C and to the first of these gates the cable would be connected. For the Times 5 Readout there always will be required one less set of gates V17 as there are denominational orders in Register A and one less order for Register B.

Due to the stepping forward of the primary commutator to put PC2 On, the second gate V36 from the left in FIG. 1J, associated with stage ST64 and controlled by wire W22, now at high potential, is now primed for conduction at the control grid and also at the suppressor grid through contacts R3 due to the fact that the bit value "64" is part of the value "77" which it was originally assumed to be entered in the binary register. In this case when the pulse is emitted over wire W12A during the second step, as described above, the gate V36 associated with stage ST64 will conduct and produce a negative pulse on wire W18 which, it will be noted in FIG. 1B, is connected to the input condenser of the trigger tube V15 for the first stage SC9 of the secondary commutator. This negative pulse turns On stage SC9 and starts the secondary commutator in operation.

The secondary commutator differs from the primary commutator in that, once started, it goes through a sequence controlled by the primary timer through wires W6, W7 to produce nine positive operating pulses on the wires W29 which will occur from left to right (FIG. 1B) in the sequence 9, 8, 7, etc., to 1. In FIG. 1E it will be noted that each wire W29 is connected to the control grids of a vertical row of readout gates V24 which are digitally related with respect to wires W39, W40, W41 according to the small numbers 1 to 9. In other words the pulses which appear in succession on wires W29 beginning with the "9" wire progressively prime for conduction all of the readout gates which are identified by the numeral "9," then the "8" gates, and so on. The readout gates are primed at their suppressor grids according to the value stored in Register A through the wires W44, W45, W46 of cables C7, C8, C9 which, it will be noted in FIGS. 1H, 1I, are connected to the right-hand grids of the stages of the register on a digital basis. Thus, if any stage of Register A is turned On to represent a digital value, the potential will rise on the corresponding wire W44, W45, W46 and prime a related gate V24 in FIG. 1E digitally in accordance with the representation of Register A.

In the present case the value "064" is stored in Register A, consequently, the sixth gate V24 from the left in FIG. 1E in the tens rows and the fourth gate from the left in the units row will be primed for conduction on the suppressor grids.

In FIG. 1D it will be noted that the wires W39, W40, W41 control the entry triggers V21. Due to the fact that the secondary commutator emits the pulses to the wires W29 in the sequence 9, 8, 7, etc., the potential on wire W40 will fall before the potential on the wire W39 and at a point in the second step (FIG. 3 of the cycle which can be taken as representative of the value of these digits. Thus, the triggers V21 will be turned On at selected times determined by the values of the digits in Register A.

The triggers V21 control the dual triode gates V22 to cut off the left-hand triodes of the gates when the triggers V21 are turned On. The extreme left-hand trigger V21 will not be turned On during the second step, since there is no zero digital time and the hundreds order of Register A is at zero. At the point representative of "6," the tens trigger V21 controlled by the wire W40 will be turned On and will cut off the left-hand triode V22. The grids of the right-hand triodes of tubes V22 are connected to wire W5 which in FIG. 1A it will be noted, is connected to the cathode of the cathode follower V3 and as a result a negative pulse is produced on wire W5 for each full cycle of the multivibrator MV. The negative pulses on wire W5 tend to periodically close the gate V2 by cutting off the right-hand triodes. Thus, when the left-hand triode V22 of the tens order is cut off and maintained cut off by tens trigger V21 as just described, positive pulses will be produced on wire W37 which (FIG. 1G) are applied to the inverter V29 for the tens order of the decimal register and advance this register six steps. This occurs at the "6" digital point of the second step in the first cycle.

In a similar fashion, at the "4" digital point in the second step of the cycle, pulses will appear on wire W38 which in FIG. 1H will cause "4" to be entered in the units order of the decimal register.

As a consequence of the first two steps, or one cycle of the primary timer, which involves a single sequence of the secondary commutator during the second step, and two steps of advance of the primary commutator, the first increment essential to the decimal conversion of "77" will be entered in the decimal register as the value "64." At the end of the second step of the primary timer Register A is again cleared and the value "32," which was transferred to Register B during the second step, will be transferred back to Register A.

During the third and fourth steps the values "32" and "16" in Register A will be halved, transferred to Register B, and "16" and "8" transferred back to Register A so that, at the end of the fourth step, the value "8" will be retained in the units order of the Register A. Since the stage ST8 is turned On, "8" being a component of "77," the value "8" will be entered in the units order of the decimal register during the fifth step in the same general fashion as the value "64" was transferred during the second step of operations, and during the fifth step the value "8" also will be halved and transferred to the Register B.

During the sixth step, the value "4" will be entered in the decimal register, halved, and "2" transferred to Register A. During the seventh step the value "2" will be halved and ultimately transferred to Register A, but will not be entered in the decimal register because the stage ST2 is turned Off. During the eighth step the value "1" will be entered in the decimal register.

During these successive steps the primary commutator is advanced one stage for each step until stage PC8 is turned On for the last step. When stage PC8 (FIG. 1B) of the primary commutator is switched Off by a pulse on wire W9, a negative pulse is produced on the wire W13 which in FIG. 1A is applied to the right-hand grid of trigger T2 to turn it Off. Trigger PC8 is automatically turned Off, as are the PC2, PC4, PC6 triggers of the primary commutator, by a negative pulse which is produced on wire W9 by the turning Off of the trigger V2 for stage ST32. The odd triggers PC1, PC3, PC5, PC7 are turned Off by negative pulses on wire W8 produced each time the stage ST16 of the primary timer is turned Off.

As a result of the foregoing operations, the component bit values involved in the value "77" have been progressively accumulated in the decimal register which has functioned like any other binary decimal register to accumulate the bit values. This mode of operation, of course, involves carries between the orders of the decimal register. As usual, the decimal register is provided with a carry trigger in the units and tens orders, designated CST in FIGS. 1G and 1H. Each time the stage ST8 in the units or tens orders is turned Off, a negative pulse is applied to the right-hand grid of the carry trigger tube V30 turning it On. This primes the carry gate V32 at the control grid. The secondary commutator causes a positive carry pulse to be applied over wire W19 to the carry gates V32. This action takes place after the "1" digit time in a cycle of operations of the secondary commutator.

When the stage SC1 (FIG. 1B) is turned Off by a pulse on wire W7, the secondary commutator carry stage SCC is turned On, thus rendering the tube V16 conductive. This produces a rise in potential on wire W19 which renders the carry gates V32 operative provided, of course, the associated carry trigger CST has been turned On. The carry trigger SCC is automatically turned Off by a pulse on wire W6 in a manner similar to the other triggers of the secondary commutator. The rise in potential on wire W19 is also applied to the grid of tube V23 (FIG. 1D) causing it to conduct momentarily. This cathode follower is connected by means of wire W42 and the diodes D1 to the left-hand grids of the entry triggers V21. Thus, the triggers V21 are turned Off along with the effecting of the carry. When the carry trigger SCC is turned Off, the potential on wire W19 drops sharply and produces a negative pulse at the grid of tube V23 which reduces the conductivity of tube V23 thus producing a sharp drop in potential below the normal level of the wire W42 which is applied to the right-hand grids of the carry triggers CST (FIGS. 1G and 1H) turning them Off.

When the last stage PC8 (FIG. 1B) of the primary commutator switches Off, the potential on the right-hand anode rises sharply and produces a positive pulse which is applied over wire W14B to the grid of the tube V13 (FIG. 1A) causing it to conduct. This produces a positive pulse on wire W17 which is applied through the diodes D3, D5 to stages ST0 of the units and tens orders of register A, thereby turning these stages Off. When the stage PC8 of the primary commutator is turned Off, a negative pulse is produced on wire W13 (FIG. 1B) which turns Off trigger T2 and stops the conversion operation.

Before commencing a conversion operation it is necessary to reset the binary register and the decimal register because the triggers in these registers may go On or Off haphazardly when the current is turned on. This may be done in a variety of ways, one simple way being to depress a manual reset key which opens contacts RC (FIGS. 1G, 1H, and 1J) to disconnect the reset bus wire W2A from the main bias wire W2.

The manner in which the circuits operate to convert decimal to binary representation will now be described. The primary timer, master control circuits, register A, Register B, the Times 5 Readout, the primary commutator, the binary register, and the keyboard are used for this operation.

The result in this case will be accumulated in the binary register and the decimal value to be converted will be entered in Register A by means of the keyboard. It will be understood, however, that a keyboard has been shown merely as a simple means of entering values in the register and that other means, such as conventional card sensing circuits with conventional readin gates might be utilized to enter the value to be converted in Register A.

The circuits are conditioned to normally effect the binary to decimal conversion and, in order to convert from decimal to binary, it is necessary to close the conversion control switch CCS in FIG. 1J, thereby energizing ther elays R1, R2, R3. The contacts of these relays are connected to invert the connections to the gates V36 and make certain circuit changes, the purpose of which will be made clear at the appropriate point hereinafter.

The keyboard is operated to enter a value by depressing the respective digit keys. It will be assumed that the value "161" is to be converted to binary representation. This is entered in Register A by depressing the "1" key K in the units order, the "6" key K in the tens order, and the "1" key K in the hundreds order. This potentially closes circuits, as described above in connection with the description of the keyboard, to the respective digit-representing triggers of Register A through the cables C13, C14, C15. Next, the entry key EK is depressed which, as described above, completes the entry in Register A by turning On the proper triggers in Register A. When the entry key EK is depressed, relay R4 is energized opening contacts R4A. This removes the right-hand grids of the tubes V33 for stages ST1 in the units order, ST6 in the tens order, and ST1 in the hundreds order from the bias line W2, triggering these stages On. The start key SK is now depressed to cause a negative pulse from source S through contacts SKC to trigger triode V5 On. Insofar as the primary timer, master control circuits, and the primary commutator are concerned, the sequence of operations is the same as when converting binary to decimal representation. The primary commutator is started in operation by triggering the first stage PC1 On.

When the trigger T3 is turned Off at the beginning of the first step or half-cycle of the primary timer, a positive pulse is produced on wire W12 which is applied to the suppressor grid of the gate V19. This positive pulse is prevented from reaching the gates V36 directly over the wire W12A because contacts R2B are now closed and contacts R2C open. Since the units order of Register A (FIG. 1) retains the odd-valued digit "1" and stage ST1 is On, there will be no current flow in the wire W32 and gate V19 will be rendered conductive when the pulse appears on wire W12. The negative pulse thus produced by gate V19 is applied to the grid of the tube V20 and produces a positive pulse on wire W33 which is transmitted to wire W12A through the contacts R2B and is applied to all of the screen grids of the gate V36 (FIG. 1J).

Since the primary commutator PC1 has been turned On, there will be a rise in potential on the wire W21 which will prime for conduction the gate V36 at the extreme left (FIG. 1J) as the result of which a negative pulse will be produced on the anode of the tube V36 which will be transmitted, through the closed contacts R1B at the extreme right to stage ST1 of the binary register, thus triggering this stage On. In this manner the units value of the number to be converted has been immediately converted into binary representation in the binary register. Also, during this first step, the Times 5 Readout becomes effective to transfer half of the amount "161" standing in Register A to Register B. This operation is exactly as described above in connection with the conversion to binary of the value "77."

As before, toward the end of the first step, a positive pulse is produced on wire W11 to reset Register A. Thus, at the end of the first step of sequence, the binary register has been turned On in stage ST1, the value "80" has been entered in Register B, and Register A has been reset. At this same time, the primary commutator is advanced a step by triggering On stage PC2 and triggering Off stage PC1. The trigger T3 is turned On, a positive pulse is produced on wire W15 which is operative through the reset switches for Register B to reset this register and, as described above, also effects transfer of the value "80" instead of "64" to Register A.

Trigger T3 is turned Off at the beginning of the second step and, in so doing, produces a negative pulse which cuts off the right-hand triode of tube V10. The left-hand triode is already cut off due to the fact that the trigger T2 is urned On. Thus, a positive pulse is produced on wire W12. This pulse, however, has no effect on the gate V19 during the second step because the units order of Register A now retains a zero with the result that current now flows in the wire W32 through transistor T1 of stage ST0, thereby elevating the cathode potential of gate V19 sufficiently to prevent conduction. Thus, in the second step of operation, the binary register is not affected and the "2" stage will not be turned On. However, the positive pulse appearing on wire W12 does cause the Times 5 Readout to enter the value "40" in Register B.

The sequence of operations for the next three steps will be similar to step 2 but will differ in that in the first of these "20" will be transferred to the Register B, during the next step "10," and during the third step "5," and in none of these steps will the binary register be affected, the reason for this being that the units order will be even in each case because of the presence of a "0" and the gates V36 will be unaffected.

At the end of the fifth step, the value "5" will be retained in the units order of Register A and, since this value is odd, stage ST32 of the binary register will be turned On during the sixth step of operations. This step will be similar to the first step, except that the primary commutator will have advanced six steps, thereby raising the potential of wire W26 which will cause the turning On of stage ST32.

During the sixth step the value "2" will be transferred to Register B through the operation of the Times 5 Readout. The valve "2" will then be transferred to the units order of the Register A and, during the seventh step, since it is an even value, the gate V19 will not conduct and the seventh step will be similar to the second cycle in that the binary register will again not be affected. However, the value "2" will be halved and transferred to Register B during this cycle through the operation of the Times 5 Readout. During the eighth step the value "1" is halved and the Times 5 Readout will be effective to set Register B in zero representation. Since the value in the Register A during the eighth step is odd, the gate V19 will conduct. The primary commutator has advanced to the stage PC8 to select the wire W28 which will render the extreme right-hand gate V36 effective to turn On the stage ST128. Thus, the binary bit values "1," "32," and "128" will be entered in the binary register by turning On the correspondingly designated stages. At the end of the eighth step the stage PC8 is turned Off and terminates further operation, exactly as in the case of conversion from binary to decimal.

In the foregoing example there was considered a case where, during the initial step, it was only necessary to turn On the stage ST1. It might have happened, however, that the units order of the number to be converted contained a digit which was represented by a combination of binary stages. For example, if the value had been "167," *it* would be necessary to turn On stages ST1, ST2, ST4 in order to accumulate in the binary register the true binary value of the converted number. In this case the sequence will be different, as it is necessary to successively turn On the 1, 2 and 4 stages ST1, ST2, ST4 of the binary register. During the first sequence the value "83" will be transferred to the Register B and, since the value "167" is odd, the first gate V36 on the left in FIG. 1J will be selected and stage ST1 turned On. During the second step the value "41" will be transferred to Register B and, since "83" is odd, the second gate V36 will be selected and the stage ST2 turned On. During the third step the number in the A register is still odd and the sequence will be repeated except that "20" will be transferred to Register B and the third gate V36 from the left will cause the stage ST4 to be turned On. During the next two steps the entries in the Registers A and B are even, and the fourth and fifth gates V36 will remain open. During the sixth cycle the value "5" will be halved and transferred to Register B and, since it is odd, the sixth gate V36 will be operative to turn On stage ST32. During the seventh step the value "2" is halved and transferred to register B and, since it is even, the seventh gate will not be affected. During the eighth step the value "1" is halved and, since it is odd, the eighth gate will be affected and cause stage ST128 to be turned On. Thus at the end of the eighth step, the stages ST1, ST2, ST4, ST32, and ST128 will all have been turned On to designate the aggregate value "167" which is the sum of the binary bit values represented by the affected stages.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. In an electronic data processing machine, a binary register having *n* stages representing powers of 2 from $2^0$ to $2^n$, each stage being settable to represent one of said powers; a decimal register, means for repeatedly halving numbers beginning with the $2^{nth}$ power in a succession of *n* halving steps, normally ineffective means for entering the halved numbers in the decimal register, and means in step with the halving means and rendered effective by the set stages of the binary register for rendering the entering means effective to enter in the decimal register the half value corresponding to the power of 2 represented by the set stage.

2. In an electronic data processing machine, a binary register having a series of stages representing powers of two for receiving a binary number for conversion to decimal representation, a decimal result register for accumulating the converted number, a computing register, means to initially enter in the computing register the highest binary bit value which may be represented by the first register, means to repeatedly halve the value in said third register, and means to enter in the result register the halved values in the third register for each stage representing the halved values represented by the binary register.

3. In an electronic data processing machine, a binary register having *n* stages representing the powers of 2 from $2^0$ to $2^n$, each stage being settable to represent one of said powers of 2, a decimal register having a plurality of denominational orders each for registering the digits 0 to 9, means operable in *n* separate steps for generating all of the powers of 2 from $2^0$ to $2^n$ and beginning with the $2^{nth}$ power, normally ineffective means for entering the powers of two in the decimal register under control of the generating means, and means in step with the generating means for progressively testing the settings of the stages of the binary register, beginning with the $2^{nth}$ stage, and operable to render the entering means effective to enter a power of 2 in the decimal register when the binary register stage corresponding to said power is in set condition.

4. In an electronic data processing machine, a binary register having *n* stages settable to designate the powers of 2 from $2^0$ to $2^n$, a decimal register having a plurality of denominational orders each for designating the degits 0 to 9; means operable in *n* steps for generating in a predetermined order all of the powers of 2 between $2^0$ to $2^n$, normally ineffective means for entering the powers of 2 in the decimal register under control of the generating means, and means for progressively testing the settings of the stages of the binary register in the same predetermined order as the generation of said powers and operative to render the entering means effective to enter in the decimal register the power of 2 corresponding to the set stage.

5. The invention set forth in claim 4 in which the generating means comprises a computing register, means to initially enter in the computing register one of the terminal powers of 2, and means to repeatedly form the other terminal power of 2 and the intervening powers from said initial power.

6. In an electronic data processing machine, a non-decimal register having $n$ stages representing a series of $n$ factors, each stage being settable to represent one of said factors; a decimal register, means for separately and successively generating said series of factors in $n$ steps, normally ineffective means for entering the generated factors in the decimal register, and means in step with the generating means and rendered effective by the set stages of the register for rendering the entering means effective to enter in the decimal register the factors corresponding to the set stage.

References Cited in the file of this patent

UNITED STATES PATENTS

| | | |
|---|---|---|
| 2,318,591 | Couffignal | May 11, 1943 |
| 2,401,621 | Desch | June 4, 1946 |
| 2,444,042 | Hartley et al. | June 29, 1948 |
| 2,647,689 | Bowyer | Aug. 4, 1953 |
| 2,745,599 | Woods-Hill et al. | May 15, 1956 |
| 2,860,831 | Hobbs | Nov. 18, 1958 |